United States Patent
Wood

(10) Patent No.: US 9,745,048 B2
(45) Date of Patent: Aug. 29, 2017

(54) MORPHING AEROFOIL

(71) Applicant: AIRBUS OPERATIONS LIMITED, Bristol (GB)

(72) Inventor: Norman Wood, Bristol (GB)

(73) Assignee: Airbus Operations Limited, Bristol (GB)

(*) Notice: Subject to any disclaimer, the term of this patent is extended or adjusted under 35 U.S.C. 154(b) by 78 days.

(21) Appl. No.: 14/397,990

(22) PCT Filed: Apr. 26, 2013

(86) PCT No.: PCT/GB2013/051060
§ 371 (c)(1),
(2) Date: Oct. 30, 2014

(87) PCT Pub. No.: WO2013/164582
PCT Pub. Date: Nov. 7, 2013

(65) Prior Publication Data
US 2015/0122951 A1    May 7, 2015

(30) Foreign Application Priority Data

Apr. 30, 2012  (GB) .................................. 1207525.5

(51) Int. Cl.
*B64C 3/44* (2006.01)
*B64C 3/48* (2006.01)

(52) U.S. Cl.
CPC ................ *B64C 3/44* (2013.01); *B64C 3/48* (2013.01); *B64C 2003/445* (2013.01)

(58) Field of Classification Search
CPC .. B64C 13/16; B64C 3/26; B64C 3/44; B64C 3/48; B64C 3/52
See application file for complete search history.

(56) References Cited

U.S. PATENT DOCUMENTS 3,042,371 A * 7/1962 Fanti ..................... F04D 29/368
                                                  244/219
3,930,626 A * 1/1976 Croswell, Jr. ............ B64C 3/48
                                                  244/219

(Continued)

FOREIGN PATENT DOCUMENTS

CN        101693467        4/2010
WO      WO 2007/091990      8/2007

(Continued)

OTHER PUBLICATIONS

International Search Report for PCT/GB2013/051060 mailed Jul. 18, 2013.

(Continued)

*Primary Examiner* — Michael Wang
(74) *Attorney, Agent, or Firm* — Nixon & Vanderhye P.C.

(57) ABSTRACT

A morphing aerofoil comprising: a leading edge; a trailing edge; and upper and lower surfaces extending between the leading and trailing edges. An upper thermal actuation member is provided proximate the upper surface; and a lower thermal actuation member is provided proximate the lower surface opposite the upper thermal actuator. The upper and lower thermal actuation members have different thermal expansion coefficients and are positioned such that they cause the trailing edge to deflect when they expand or contract by different amounts in response to a change in ambient temperature, thereby changing a camber of the aerofoil.

32 Claims, 6 Drawing Sheets

(56) References Cited

U.S. PATENT DOCUMENTS

| | | | | |
|---|---|---|---|---|
| 5,114,104 | A | * | 5/1992 | Cincotta ................ B64C 3/48 114/152 |
| 5,662,294 | A | * | 9/1997 | Maclean ................ B63B 1/28 114/140 |
| 5,752,672 | A | * | 5/1998 | McKillip, Jr. .......... B64C 13/50 244/17.13 |
| 5,806,798 | A | | 9/1998 | Gillandt et al. |
| 5,897,076 | A | * | 4/1999 | Tracy .................... B64C 3/14 244/117 A |
| 6,182,929 | B1 | * | 2/2001 | Martin .................. B63B 1/248 244/219 |
| 6,372,072 | B1 | * | 4/2002 | Healey .................. B32B 5/26 156/148 |
| 6,588,709 | B1 | * | 7/2003 | Dunne ................... B64C 3/48 16/225 |
| 6,979,050 | B2 | * | 12/2005 | Browne ................. B62D 35/00 296/180.1 |
| 7,669,799 | B2 | * | 3/2010 | Elzey .................... B32B 3/28 244/123.1 |
| 9,120,554 | B2 | * | 9/2015 | Shome ................... B64C 3/48 |
| 9,145,198 | B1 | * | 9/2015 | Shome ................... B64C 3/48 |
| 2006/0145031 | A1 | | 7/2006 | Ishikawa et al. |
| 2009/0308124 | A1 | * | 12/2009 | Iannucci ................ B64C 3/48 72/54 |
| 2011/0030380 | A1 | | 2/2011 | Widdle et al. |
| 2011/0038727 | A1 | * | 2/2011 | Vos ....................... B64C 3/46 416/1 |
| 2011/0042524 | A1 | * | 2/2011 | Hemmelgarn ........... B64C 3/48 244/203 |
| 2011/0084174 | A1 | * | 4/2011 | Hemmelgarn ........... B64C 3/48 244/200 |

FOREIGN PATENT DOCUMENTS

| | | |
|---|---|---|
| WO | WO 2008/036122 | 3/2008 |
| WO | WO 2009/023352 | 2/2009 |
| WO | WO 2011/059571 | 5/2011 |

OTHER PUBLICATIONS

Written Opinion of the International Searching Authority for PCT/GB2013/051060 mailed Jul. 18, 2013.

Search Report for GB 1207525.5 dated Jul. 18, 2012.

F. Mattioni et al., "The Application of Thermally Induced Multistable Composites to Morphing Aircraft Structures", Industrial and Commercial Applications of Smart Structures Technologies 2008, Proc. of SPIE vol. 6930 693012-1, 11 pages.

Y. He et al., "Modeling and Experiment of a Morphing Wing Integrated with a Trailing Edge Control Actuation System", Chinese Journal of Mechanical Engineering, Dec. 13, 2011, 8 pages.

* cited by examiner

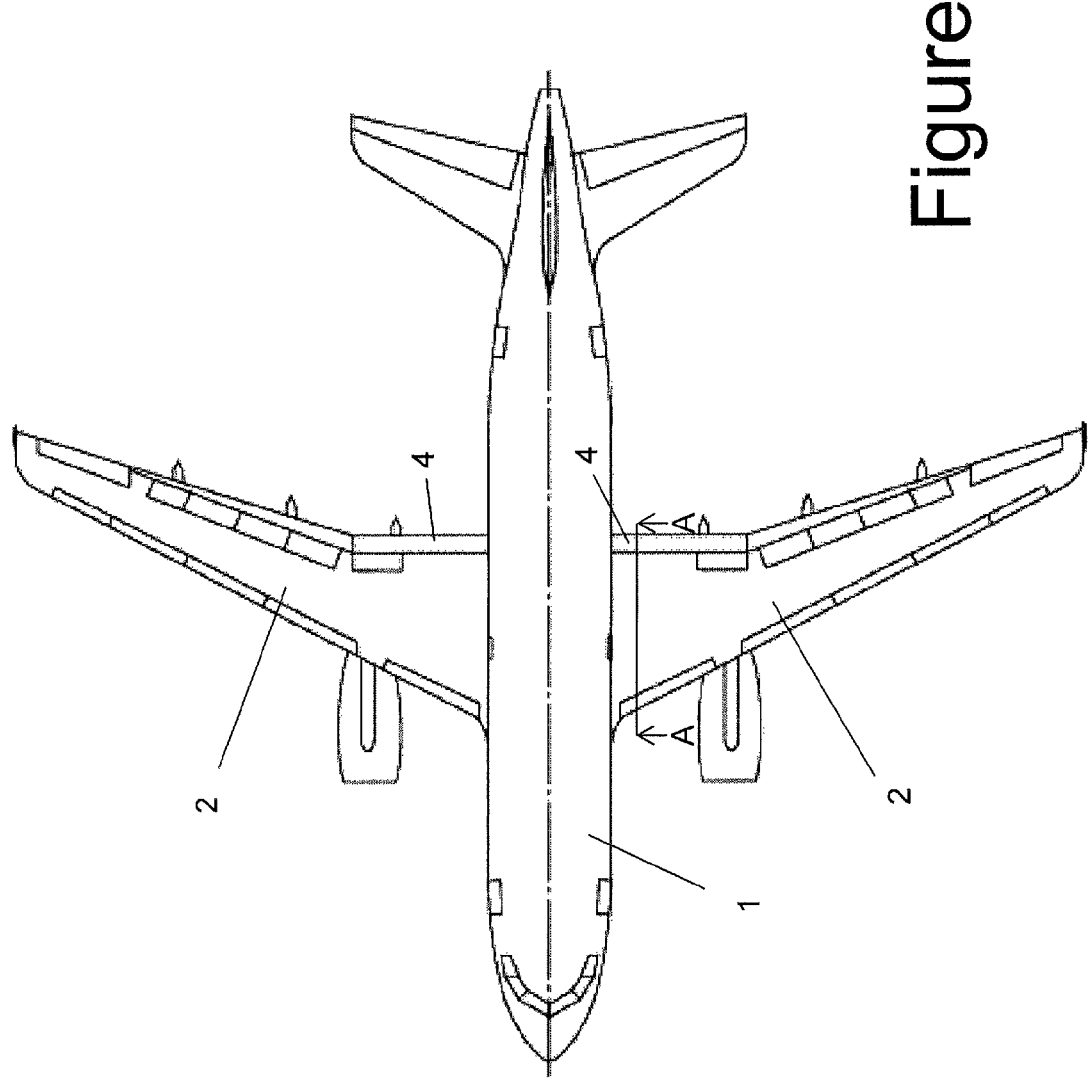

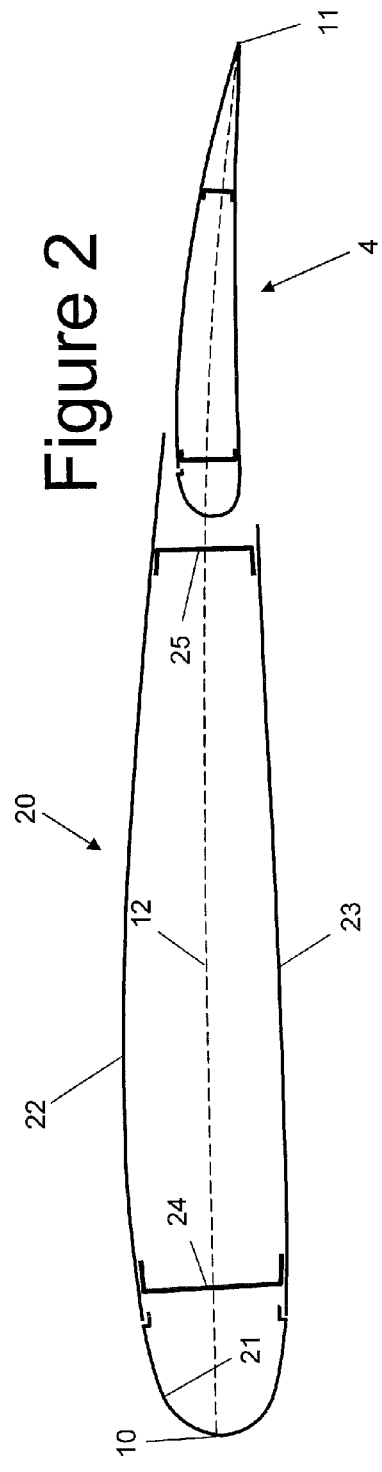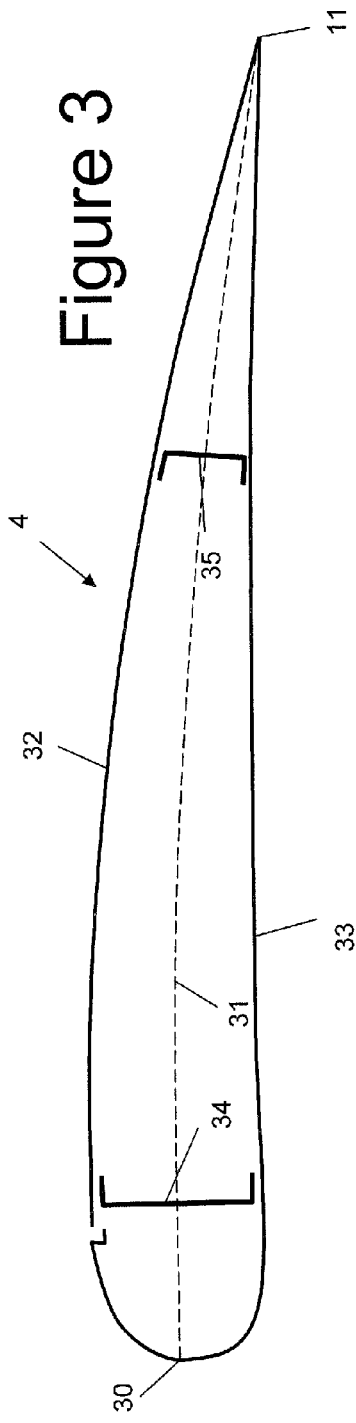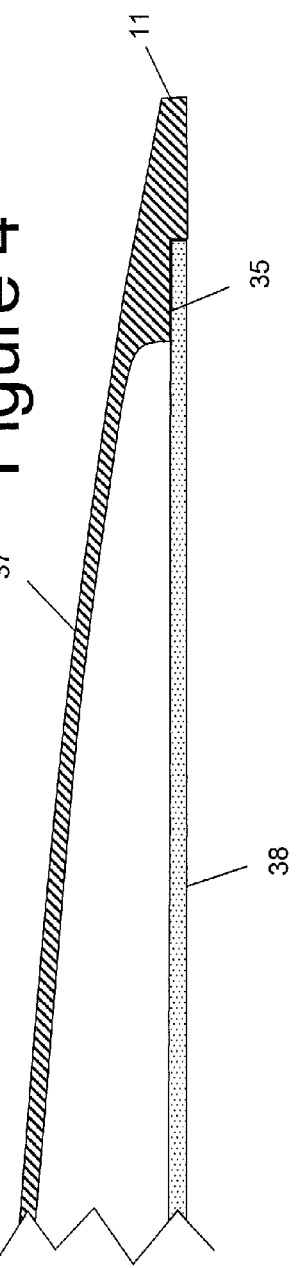

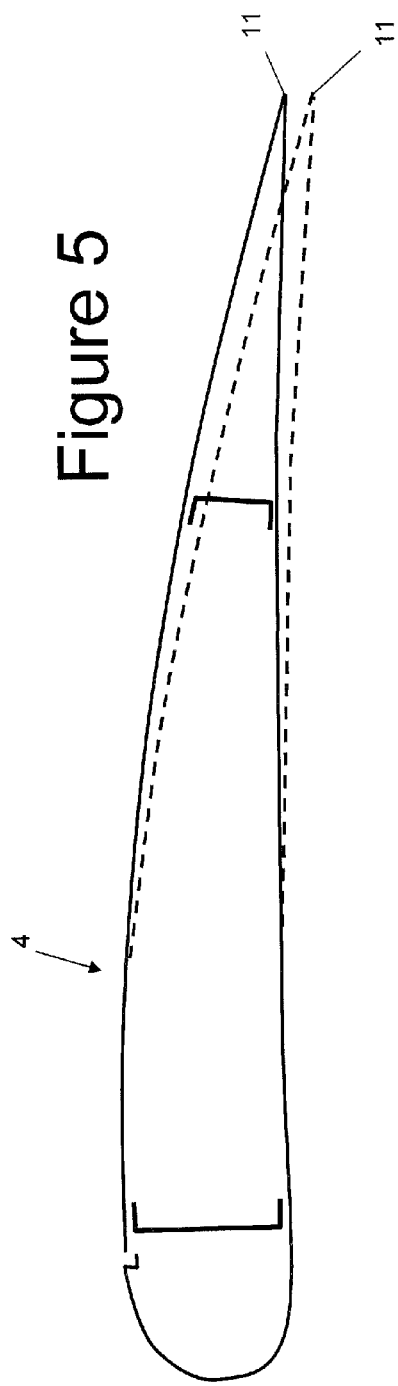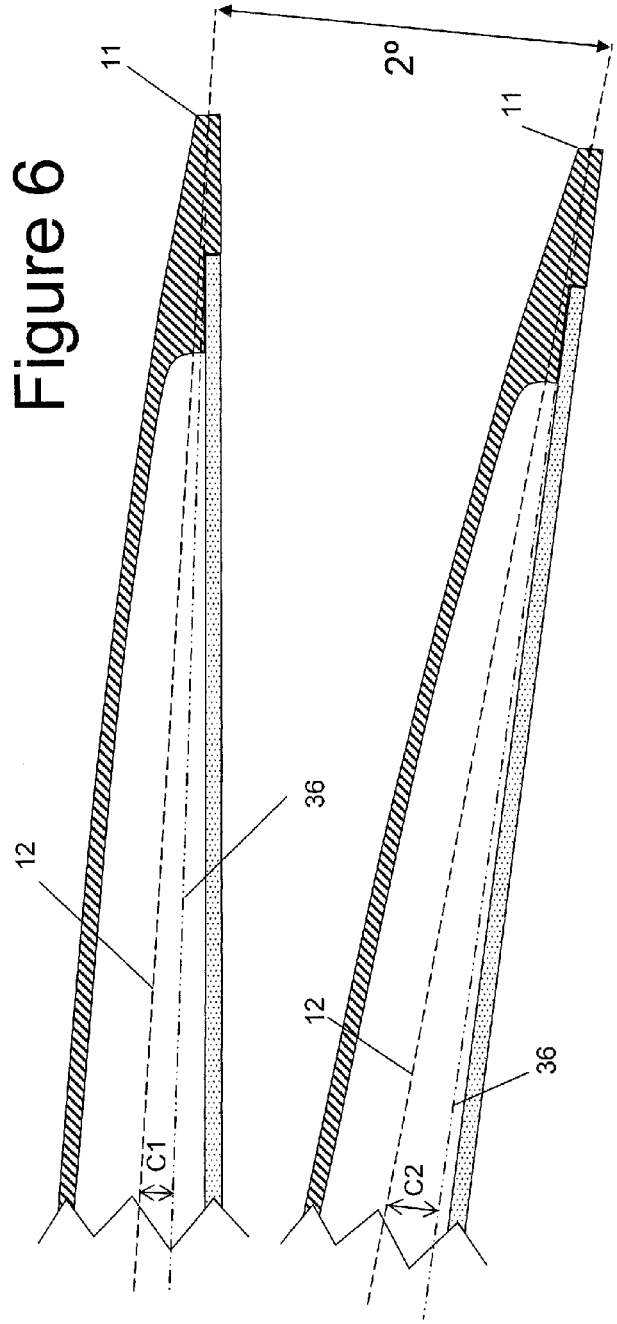

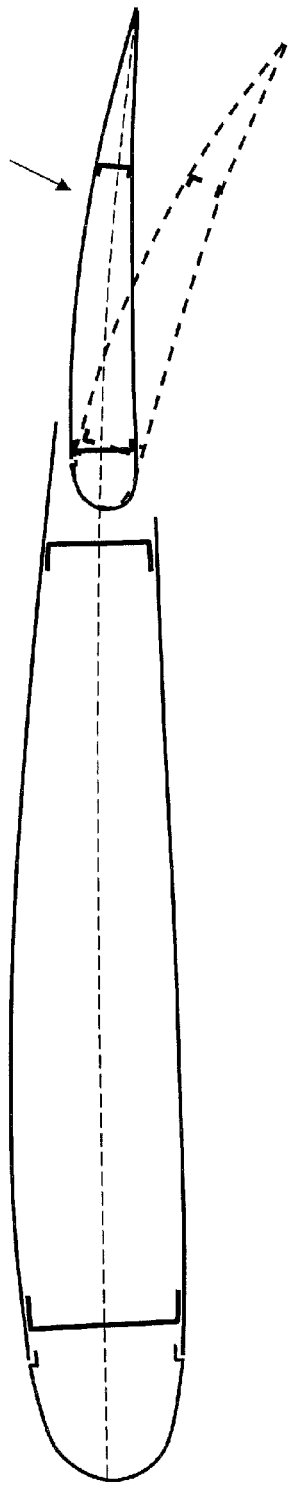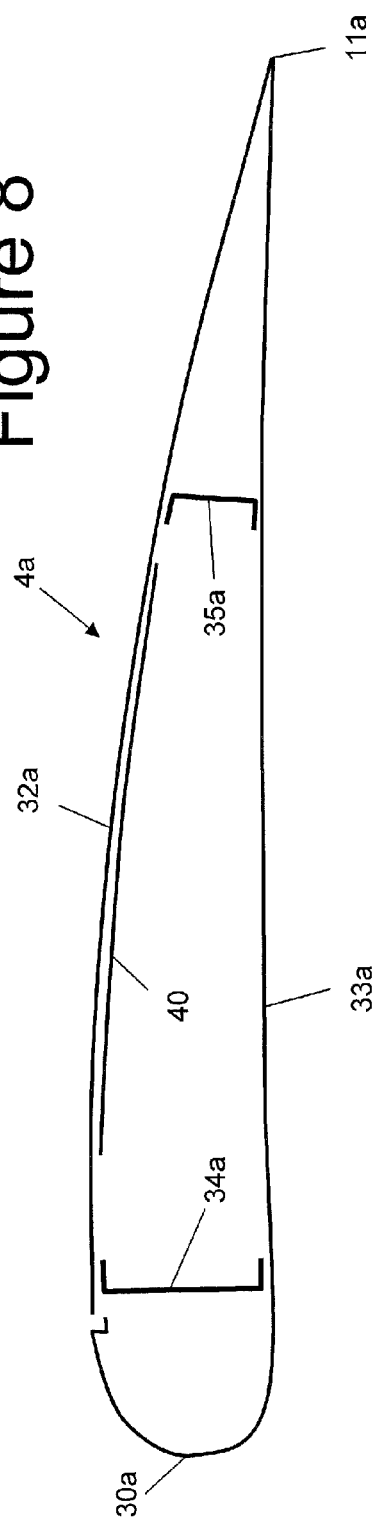

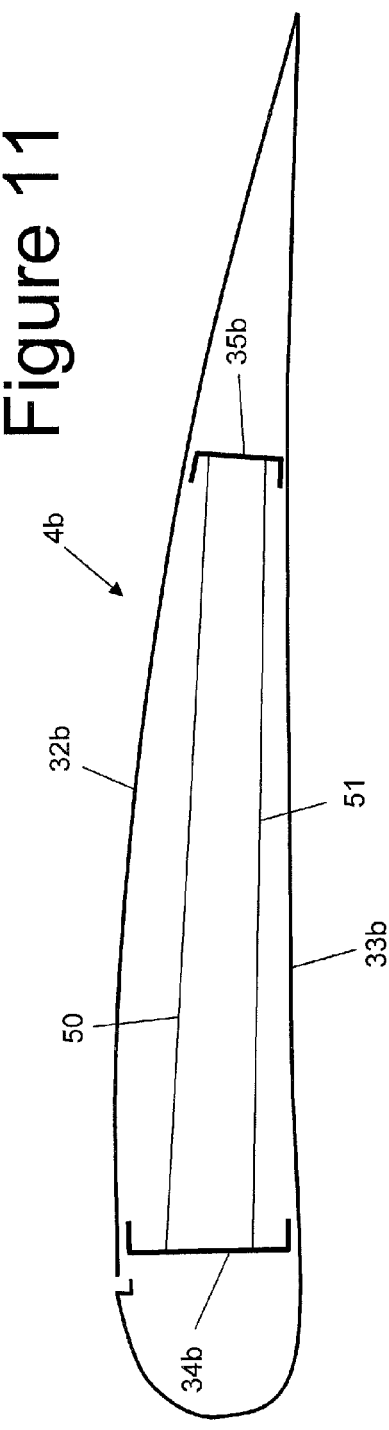
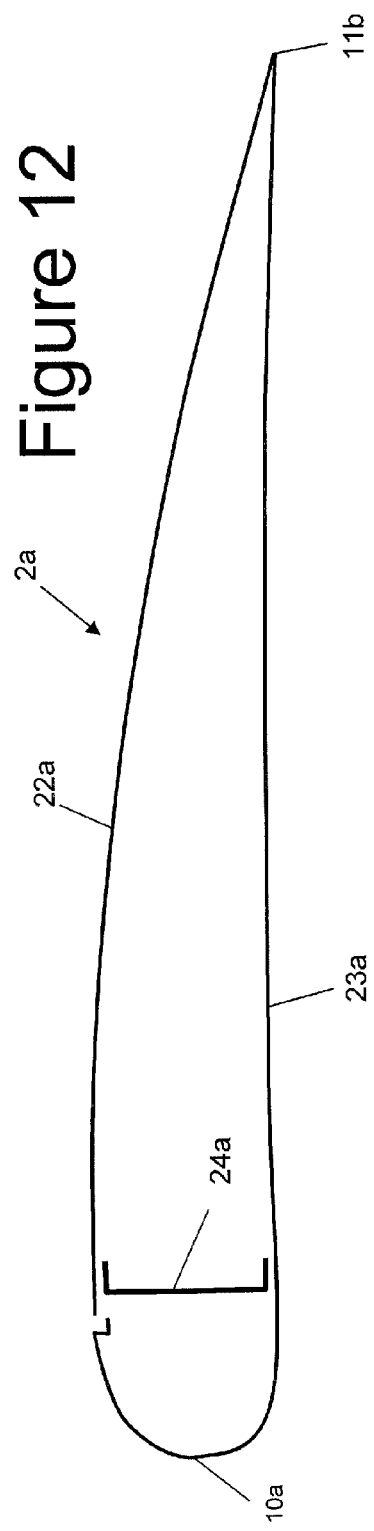

MORPHING AEROFOIL

This application is the U.S. national phase of International Application No. PCT/GB2013/051060 filed 26 Apr. 2013 which designated the U.S. and claims priority to GB 1207525.5 filed 30 Apr. 2012, the entire contents of each of which are hereby incorporated by reference.

FIELD OF THE INVENTION

The present invention relates to a morphing aerofoil with a variable camber trailing edge.

BACKGROUND OF THE INVENTION

A variable camber trailing edge is described in Mattioni, F., Weaver, P, M., Potter, K. D., & Friswell, M. I. (2008), The application of thermally induced multistable composites to morphing aircraft structures, (L. P. Davis, B. K. Henderson, & M. B. McMickell, Eds.), *Proceedings of SPIE, 6930*, 693012-693012-11. Asymmetric patches of composite material are embedded in the upper and lower skin of the trailing edge, resulting in four equilibrium conditions. Moving between these conditions may be achieved using an actuation system or aerodynamic loads. During actuation, the upper skin is clamped and the lower skin is pushed to simulate an actuation load.

A morphing wing with a trailing edge actuation mechanism is described in H E Yuanyuan, GUO Shijun, Modeling and Experiment of a Morphing Wing Integrated with a Trailing Edge Control Actuation System, Chinese Journal of Mechanical Engineering, Dec. 13, 2011. The actuation mechanism is made of a curved torque tube connected between an actuator and the trailing edge skin structure through discs.

SUMMARY OF THE INVENTION

A first aspect of the invention provides a morphing aerofoil comprising: a leading edge; a trailing edge; upper and lower surfaces extending between the leading and trailing edges; an upper thermal actuation member proximate the upper surface (that is, closer to the upper surface than the lower surface); and a lower thermal actuation member proximate the lower surface (that is, closer to the lower surface than the upper surface) opposite the upper thermal actuator, wherein the upper and lower thermal actuation members have different thermal expansion coefficients and are positioned such that they cause the trailing edge to deflect when they expand or contract by different amounts in response to a change in ambient temperature, thereby changing a camber of the aerofoil.

A second aspect of the invention provides a method of morphing an aerofoil of an aircraft, the aerofoil comprising: a leading edge; a trailing edge; upper and lower surfaces extending between the leading and trailing edges; an upper thermal actuation member proximate the upper surface; and a lower thermal actuation member proximate the lower surface opposite the upper thermal actuator, wherein the upper and lower thermal actuation members have different thermal expansion coefficients; the method comprising changing the altitude of the aircraft thereby changing the ambient temperature, wherein the expansion members expand or contract by different amounts in response to the change in ambient temperature thereby causing the trailing edge to deflect and change a camber of the aerofoil.

The invention provides an alternative actuation mechanism to those described in the prior art. The camber of the aerofoil changes in response to a change in ambient temperature, without requiring the use of power or any other control system.

Preferably the upper and lower thermal actuation members have different linear thermal expansion coefficients at least in a chordwise direction such that they expand or contract by different amounts in the chordwise direction from the leading edge to the trailing edge. The degree of differential expansion and contraction in the spanwise direction (perpendicular to the chordwise direction) may be constrained so that any spanwise bending of the aerofoil is less than the chordwise bending which gives the change of camber.

Preferably the upper and lower thermal actuation members have linear thermal expansion (LTE) coefficients which differ by a factor of more than 4, and preferably more than 7. As a result the upper and lower thermal actuation members expand or contract by amounts which differ by a factor of more than 4, and preferably more than 7.

Typically the thermal actuation member with the higher coefficient comprises a metal such as Aluminium.

Typically the thermal actuation member with the higher coefficient is formed from a material with symmetrical or isotropic material properties. Thus for example the material preferably has a linear thermal expansion coefficient which is substantially the same in three orthogonal directions. As another example the material above a mid-plane of the member is preferably a mirror image of the material below the mid-plane.

Typically the thermal actuation member with the lower thermal expansion coefficient comprises a fibre-reinforced polymer (preferably reinforced by carbon fibres), ceramic, or wood.

In the case where the thermal actuation member with the lower thermal expansion coefficient is formed from a fibre-reinforced laminate, the fibres are preferably laid up symmetrically (in contrast to the asymmetric lay-up described in Mattioni et al.)—in other words the layers of fibre above the mid-plane of the member are a mirror image of the layers below the mid-plane.

Preferably the thermal actuation member with the lower thermal expansion coefficient has higher stiffness in the spanwise sense than in the chordwise sense, so that it bends more easily in the chordwise sense giving a change of camber, and less easily in a spanwise sense.

One or both of the actuation members may comprise a shape memory alloy but this is not preferred since such alloys may be expensive and difficult to integrate into the structure of the aerofoil. Therefore preferably both the upper and lower thermal actuation members do not have a shape memory.

Typically at least the aft-most parts of the thermal actuation members are positioned aft of 50% chord, more typically aft of 65% chord, preferably aft of 80% chord, and most preferably aft of 95% chord, where the % chord position is defined in the conventional manner by the point where a perpendicular line from a chordline of the aerofoil meets the aft-most part of the member.

The aerofoil typically comprises upper and lower skin panel members which form at least part of said upper or lower surfaces. The upper and/or lower thermal actuation member may comprise an elongate member which is attached to one of the skin panel members and has a different thermal expansion coefficient to the skin panel member. The elongate member may be for example bonded to the inner surface of the skin panel member, or embedded within the panel member. Alternatively the upper and/or lower thermal actuation member may comprise an elongate member such as a rod which is not attached to a skin panel member. In this case the elongate member is not attached to the upper or lower skin panel, but is proximate the upper or lower surface in the sense that it is closer to one surface than the other. Alternatively the upper and/or lower thermal actuation member may comprise one of said skin panel members which forms at least part of said upper or lower surface. In other words, in this example the actuator forms a structural part of the aerofoil's skin panel and is not an additional member which is attached to such a skin panel member. The thermal actuation members may comprise upper and lower trailing edge skin panels which form part of said upper and lower surfaces respectively and are attached to each other near the trailing edge.

If the thermal actuation member with the higher thermal expansion coefficient is elongate, then its length axis is preferably aligned in a chordwise direction so that it expands predominantly towards the trailing edge.

Typically the aerofoil comprises one or more spars which extend along a span of the aerofoil; the spar(s) include(s) a rear spar which is positioned furthest aft; and at least part (i.e. the aft-most part) of said upper and lower thermal actuation members are positioned aft of the rear spar. Optionally the forward-most part of each actuator may also be positioned aft of the rear spar. The aerofoil may have only one spar, or it may have two or more spars including a forward spar as well as the rear spar.

For near ground operation the temperature is typically of the order of 20° C. while at cruise it is typically of the order of −50° C. Thus preferably the upper and lower thermal actuation members are arranged such that the upper and lower surfaces will deflect at the trailing edge by more than 1° in response to a 50° C. change in ambient temperature. Typically the upper and lower thermal actuation members are also arranged such that the upper and lower surfaces will deflect at the trailing edge by less than 5° in response to a 50° C. change in ambient temperature.

Typically the aerofoil comprises a leading edge structure which includes the leading edge; a trailing edge structure which includes the trailing edge; and a core structure between the leading and trailing edge structures; wherein the upper and lower thermal actuation members are positioned at least partially in the trailing edge structure such that they cause the trailing edge structure to deflect relative to the core structure when they expand or contract by different amounts in response to a change in ambient temperature, thereby changing a camber of the trailing edge structure. The trailing edge structure may be otherwise fixed relative to the core structure, or it may comprise a high lift flap comprising a flap leading edge; a flap trailing edge which comprises the trailing edge of the aerofoil; and upper and lower flap surfaces extending between the leading and trailing edges of the flap.

The aerofoil may comprise a high lift flap for an aircraft wing, or it may comprise an aircraft wing (which may be a main wing or a horizontal tail plane).

In the embodiment described below the upper actuation member has a higher thermal expansion coefficient than the lower actuation member, so the camber of the aerofoil decreases as the ambient temperature decreases during ascent of the aircraft (and vice versa during descent). This can provides a beneficial effect during cruise of the aircraft by reducing shock strength and/or assisting in establishing natural laminar flow conditions. Also the increased camber during landing approach increases lift and thus can reduce the size of high lift flap which is required for a given lift. However the upper actuation member may instead have a lower thermal expansion coefficient than the lower actuation member, so the camber increases during ascent of the aircraft and decreases during descent.

BRIEF DESCRIPTION OF THE DRAWINGS

Embodiments of the invention will now be described with reference to the accompanying drawings, in which:

FIG. 1 is a plan view of an aircraft according to an embodiment of the present invention;

FIG. 2 is a cross-sectional view taken along a line A-A in FIG. 1;

FIG. 3 is an enlarged cross-sectional view of the flap;

FIG. 4 is an enlarged cross-sectional view of the trailing edge of the flap of FIG. 3;

FIG. 5 shows the flap trailing edge deflecting due to a change in ambient temperature;

FIG. 6 is an enlarged cross-sectional view of the trailing edge of the flap in two positions;

FIG. 7 is a cross-sectional view taken along a line A-A in FIG. 1 showing the flap in its deployed position in dashed lines;

FIG. 8 is a cross-sectional view of an aircraft flap according to a further embodiment of the invention;

FIG. 11 is a cross-sectional view of an aircraft flap according to a further embodiment of the invention; and FIG. 12 is a cross-sectional view of an aircraft wing according to a further embodiment of the invention.

DETAILED DESCRIPTION OF EMBODIMENT(S)

Figure 9:
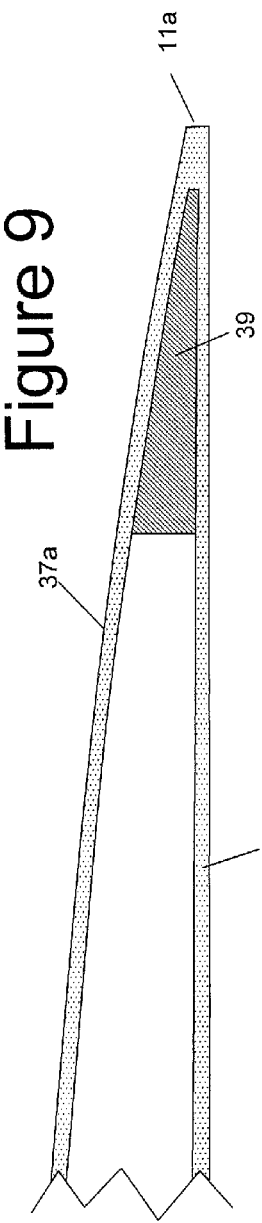
FIG. 9 is an enlarged cross-sectional view of the trailing edge of the flap of FIG. 8.

An aircraft shown in FIG. 1 comprises a fuselage 1 and a pair of wings 2 attached to the fuselage. Each wing 2 extends in a spanwise direction from the fuselage to a wing tip.

Each wing comprises a row of high lift flaps 4 and FIG. 2 is a chordwise cross-sectional view taken along a chord line A-A through one of the flaps 4 parallel with the long axis of the fuselage 1 and the free stream direction.

The wing 2 has a leading edge 10; a trailing edge 11; and upper and lower surfaces. The upper and lower surfaces extend between the leading and trailing edges in a chordwise direction as shown in FIG. 2, and also extend in a spanwise direction between the wing root and the wing tip as shown in FIG. 1. A camber line 12 extends between the leading and trailing edges and divides the aerofoil into an upper half including the upper surface and a lower half including the lower surface.

The wing section comprises three parts: a wing box 20 which forms the core structure of the wing; a leading edge structure 21 attached to the front of the wing box 20; and a flap 4 attached to the rear of the wing box 20. The wing box 20 comprises an upper skin 22; a lower skin 23; a forward spar 24 extending along the span of the wing; and a rear spar 25 also extending along the span of the wing. The skins 22, 23 extend between, and are attached to, the spars 24, 25. The wing box 20 also comprises vertical ribs (not shown) which are spaced apart in a spanwise direction and attached to the skins 22,23 and spars 24,25. The leading edge structure 21 is attached to the skins 22,23 by joggle joints. The rear spar 25 is positioned at approximately 65% chord.

The upper and lower skins 22,23 are typically formed from the same material—either Aluminium or carbon fibre reinforced polymer (CFRP). The leading edge structure 21 may be formed from Aluminium, CFRP, or a combination thereof.

The flap 4 shown in detail in FIG. 3 has a leading edge 30; a trailing edge 11 (which is also the trailing edge of the wing); and upper and lower surfaces extending between the leading and trailing edges. A camber line 31 extends between the leading and trailing edges and divides the flap into an upper half including the upper surface and a lower half including the lower surface.

The flap 4 comprises an upper skin 32; a lower skin 33; a forward spar 34 and a rear spar 35. The skins 32, 33 extend between, and are attached, to the spars 34, 35. The flap 4 may or may not also comprise vertical ribs (not shown) which are spaced apart along the span of the flap and attached to the skins 32,33 and spars 34,35. The lower skin 33 extends around the leading edge of the flap and is attached to the upper skin 32 by a joggle joint.

The upper skin 32 is formed from Aluminium skin panels, whereas the lower skin 33 is formed from panels of carbon fibre reinforced polymer (CFRP). FIG. 4 shows the joint between an Aluminium trailing edge upper skin panel 37 (which forms the rearmost part of the upper skin 32) and a CFRP trailing edge lower skin panel 38 (which forms the rearmost part of the lower skin 33). The panel 37 extends to the trailing edge 11 and has a recess 35 in which the rear edge of the panel 38 is seated. The panel 38 is attached to the recess 35 by fasteners and/or adhesive (not shown).

When the aircraft is at cruise altitude the flap 4 adopts the shape shown in solid lines in FIG. 5. However as the aircraft descends towards the ground the increase in ambient temperature causes the upper skin to expand in the chordwise direction more than the lower skin (due to their different linear thermal expansion coefficients in the chordwise direction). This difference in linear thermal expansion (LTE) coefficients causes the trailing edge 11 to deflect to the position shown in dashed lines in FIG. 5, thereby changing a camber of the flap and of the aerofoil as a whole.

Attaching the trailing edge skin panels 37,38 at the trailing edge constrains them in a spanwise sense so the amount of spanwise or dihedral deflection caused by their differential expansion is relatively low.

The LTE coefficient of Aluminium is about 23*10-6/° C. at 20° C. Since Aluminium is an isotropic material the LTE coefficient is substantially the same in all directions. The LTE coefficient of thermal expansion of CFRP on the other hand is much lower: typically between 1*10-6/° C. and 5*10-6/° C. at 20°—that is, in the range of 4.6 to 23 times lower than that of Aluminium. The LTE coefficient of CFRP may be different in the spanwise, chordwise and thickness directions. In this case it is the LTE coefficient in the chordwise direction which is important, and which must be significantly lower than that of Aluminium at 20° C.

Optionally the carbon fibres in the lower skin 33 may be arranged so that a majority of the fibres extend in the spanwise direction. As a result the lower skin 33 will be more stiff in the spanwise direction and less stiff in the chordwise direction so the skin 33 will bend more easily in the chordwise direction (enabling a large change of camber) than in the spanwise direction. Although maximising the spanwise fibres means that the LTE coefficient of the CFRP will be greater in the chordwise direction than in the spanwise direction, the chordwise LTE coefficient will still be significantly less than that of the Aluminium upper skin.

Preferably the fibres are preferably laid up symmetrically—in other words the layers of fibre above the mid-plane of the lower skin 33 are a mirror image of the layers below the mid-plane.

FIG. 6 shows the deflection of the trailing edge in close-up. The upper part of FIG. 6 shows the trailing edge 11 in its cruise position and the lower part of FIG. 6 shows the trailing edge 11 in its deflected position. The camber of the wing can be defined at any chordwise location as the distance between the camber line 12 and a chord line 36 (which is a straight line joining the leading and trailing edges of the wing). In its cruise shape the camber C1 is illustrated at a given chordwise position. In its deflected shape (lower part of FIG. 6) the camber at this same chordwise position has increased to C2. The camber line 12 and the upper and lower panels deflect by an angle of about 2° between the two shapes. Shortly before landing, the flap 4 is deployed to the high lift position shown in dashed lines in FIG. 7 by a flap actuation mechanism (not shown).

FIG. 8 shows an alternative flap 4a which can be substituted for the flap 4 in FIG. 2. The flap 4a comprises an upper skin 32a; a lower skin 33a; a forward spar 34a and a rear spar 35a. The skins 32a, 33a extend between, and are attached, to the spars 34a, 35a. The flap may or may not also comprise vertical ribs (not shown) which are spaced apart along the span of the flap and attached to the skins 32a,33a and spars 34a,35a. The lower skin 33a extends around the leading edge 30a of the flap and is attached to the upper skin 32a by a joggle joint.

Both skins 32a,33a are formed from panels of carbon fibre reinforced polymer (CFRP). FIG. 9 shows the joint at the trailing edge 11a between a CFRP upper skin panel 37a (which forms the rearmost part of the upper skin 32a) and a CFRP trailing edge lower skin panel 38a (which forms the rearmost part of the lower skin 33a). The panels 37a,38a are bonded together at the trailing edge 11a and a filler 39 fills the gap between them.

Figure 10:
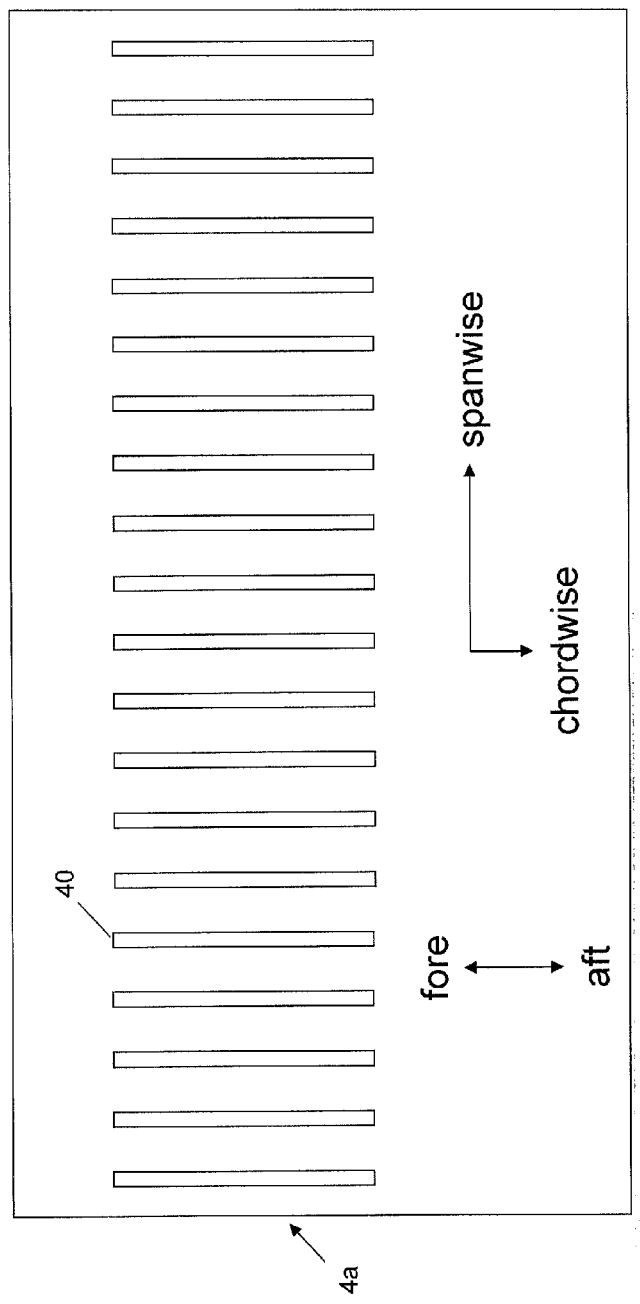
FIG. 10 is a plan view of the flap of FIG. 8.

The upper skin 32a has an outer aerodynamic surface, and an inner surface which carries a series of elongate Aluminium strips 40 which are bonded to the skin by an adhesive (not shown). FIG. 10 is a plan view of the flap 4a showing twenty of such strips 40 (the strips will not be visible from above but are shown in FIG. 10 for illustrative purposes). As can be seen in FIG. 10 the long axes of the strips 40 are aligned in the chordwise direction so they expand predominantly towards the trailing edge. The strips 40 and lower skin 33a act as thermal actuation members which expand chordwise by different amounts as the ambient temperature increases, causing the trailing edge 11a of the flap to deflect in a similar manner to the trailing edge 11 of the flap 4.

FIG. 11 shows an alternative flap 4b which can be substituted for the flap 4 in FIG. 2. The flap 4b comprises an upper skin 32b; a lower skin 33b; a forward spar 34b and a rear spar 35b. The skins 32b, 33b extend between, and are attached, to the spars 34b, 35b. The flap may or may not also comprise vertical ribs (not shown) which are spaced apart along the span of the flap and attached to the skins 32b,33b and spars 34b,35b. The lower skin 33b extends around the leading edge of the flap and is attached to the upper skin 32b by a joggle joint.

Both skins 32b,33b are formed from panels of carbon fibre reinforced polymer (CFRP) and they are joined at the trailing edge in a similar manner to the skins 32a,33a as shown in FIG. 9.

A series of Aluminium actuation rods 50 are attached to the forward and rear spars 34b,35b on the upper half of the flap proximate the upper surface; and a series of CFRP actuation rods 51 are attached to the forward and rear spars 34b,35b on the lower half of the flap proximate the lower surface. The rods 50,51 act as thermal actuation members which expand lengthwise by different amounts as the ambient temperature increases, causing the trailing edge of the flap to deflect in a similar manner to the flap 4. The long axes of the rods 50,51 extend in a predominantly chordwise direction.

FIG. 12 shows a wing 2a with a leading edge 10a; a trailing edge 11b; and upper and lower surfaces extending between the leading and trailing edges. The wing 2a comprises an upper skin 22a; a lower skin 23a; and a single spar 24a. The skins 22a, 23a are attached to the spar 24a and extend all the way to the trailing edge 11b where they are joined by a joint of the kind shown in FIG. 3. Note that the wing 2a has no flaps, and instead of having a distinct central core wing box structure with attached leading and trailing edge structures, these structures are formed as a more continuous piece. The wing also has no vertical ribs and the space between the skins is filled by a honeycomb material. The lower skin 23a is attached to the upper skin 22a by a joggle joint.

The upper skin 22a is formed from Aluminium skin panels, whereas the lower skin 23a is formed from panels of carbon fibre reinforced polymer (CFRP). The skins 22a,23a act as temperature sensitive thermal actuation members which expand chordwise by different amounts as the ambient temperature increases, causing the trailing edge 11b of the wing 2a to deflect in a similar manner to the flap 4.

Although the invention has been described above with reference to one or more preferred embodiments, it will be appreciated that various changes or modifications may be made without departing from the scope of the invention as defined in the appended claims.

The invention claimed is:

1. A morphing airfoil comprising:
a leading edge; a trailing edge; upper and lower surfaces extending between the leading and trailing edges;
an upper thermal actuation member proximate the upper surface; and
a lower thermal actuation member proximate the lower surface opposite the upper thermal actuation member,
wherein the upper and lower thermal actuation members have different thermal expansion coefficients and are positioned such that they cause the trailing edge to deflect when the upper and lower thermal actuation members expand or contract by different amounts in response to a change in ambient temperature caused by a change in altitude thereby changing a camber of the airfoil,
wherein the morphing airfoil does not include a heating system arranged to heat the upper and lower thermal actuation members to cause the trailing edge to deflect.

2. The airfoil of claim 1 wherein at least part of the thermal actuation members are positioned aft of 65% chord.

3. The airfoil of claim 1 wherein the upper or lower thermal actuation member comprises a skin panel which forms at least part of said upper or lower surface.

4. The airfoil of claim 1 further comprising a skin panel member which forms at least part of said upper or lower surface, wherein the upper or lower thermal actuation member comprises an elongate strip which is attached to the skin panel member and has a different thermal expansion coefficient to the skin panel member.

5. The airfoil of claim 4 wherein the skin panel member has an outer surface which forms at least part of said upper or lower surface, and an inner surface opposite the outer surface; and wherein the strip is bonded to the inner surface of the skin panel member.

6. The airfoil of claim 1 wherein the thermal actuation members comprise upper and lower trailing edge skin panels which form part of said upper and lower surfaces respectively and are attached to each other near the trailing edge.

7. The airfoil of claim 1 wherein the airfoil comprises one or more spars which extend along a span of the airfoil; the one or more spars include a rear spar which is positioned furthest aft of the one or more spars; and wherein at least part of said upper and lower thermal actuation members are positioned aft of the rear spar.

8. The airfoil of claim 1 wherein the upper and lower thermal actuation members are arranged such that the upper and lower surfaces will deflect at the trailing edge by more than 1° in response to a 50° C. change in ambient temperature.

9. The airfoil of claim 1 comprising a leading edge structure which includes the leading edge; a trailing edge structure which includes the trailing edge; and a core structure between the leading and trailing edge structures; wherein the upper and lower thermal actuation members are positioned at least partially in the trailing edge structure such that they cause the trailing edge structure to deflect relative to the core structure when they expand or contract by different amounts in response to a change in ambient temperature, thereby changing a camber of the trailing edge structure.

10. The airfoil of claim 9 wherein the trailing edge structure is a high lift flap comprising a flap leading edge; a flap trailing edge which comprises the trailing edge of the airfoil; and upper and lower flap surfaces extending between the leading and trailing edges of the flap.

11. The airfoil of claim 1 wherein the airfoil is a high lift flap for an aircraft wing.

12. The airfoil of claim 1 wherein the airfoil is an aircraft wing.

13. The airfoil of claim 1 wherein the upper and lower thermal actuation members do not have a shape memory.

14. The airfoil of claim 1 wherein the upper and lower thermal actuation members have different linear thermal expansion coefficients.

15. The airfoil of claim 14 wherein the upper and lower thermal actuation members have different linear thermal expansion coefficients at least in a chordwise direction from the leading edge to the trailing edge.

16. The airfoil of claim 14 wherein the upper and lower thermal actuation members have linear thermal expansion coefficients which differ by a factor of more than 4.

17. The airfoil of claim 1 wherein one of the thermal actuation members comprises a metal member and the other comprises a fibre-reinforced polymer member.

18. The airfoil of claim 1 wherein the thermal actuation member with the higher thermal expansion coefficient is elongate, with its length axis aligned toward the trailing edge so that it expands predominantly towards the trailing edge.

19. The airfoil of claim 1 wherein the thermal actuation member with the higher thermal expansion coefficient is formed from a material with a linear thermal expansion coefficient which is substantially the same in three orthogonal directions.

20. An aircraft comprising a fuselage; and an airfoil according to claim 1 coupled to said fuselage.

21. The airfoil of claim 1 wherein the upper and lower thermal actuation members are positioned to deflect the trailing edge in response to the change in ambient temperature and without the use of a heating system of the aircraft to change temperatures of the upper and lower thermal actuation members.

22. The airfoil of claim 1 wherein the upper thermal actuation member has a higher thermal expansion coefficient than a thermal expansion coefficient of the lower thermal actuation member, so the camber of the airfoil decreases during ascent of the aircraft and increases during descent of the aircraft.

23. A method of morphing an airfoil of an aircraft, the airfoil comprising:
   a leading edge; a trailing edge; upper and lower surfaces extending between the leading and trailing edges;
   an upper thermal actuation member proximate the upper surface; and
   a lower thermal actuation member proximate the lower surface opposite the upper thermal actuation member,
   wherein the upper and lower thermal actuation members have different thermal expansion coefficients;
   the method comprising changing the altitude of the aircraft thereby changing the ambient temperature, wherein the upper and lower thermal actuation members expand or contract by different amounts in response to the change in ambient temperature thereby causing the trailing edge to deflect and change a camber of the airfoil,
   wherein the method does not comprise using a heating system of the aircraft to heat the upper and lower thermal actuation members to cause the trailing edge to deflect.

24. The method of claim 23 wherein the upper and lower thermal actuation members expand or contract by amounts which differ by a factor of more than 4.

25. The method of claim 23 wherein the expansion or contraction of the upper and lower thermal actuation members deflect the trailing edge by more than one degree in response to a change of at least fifty Celsius (50° C.) in the ambient temperature.

26. The method of claim 23 wherein the upper and lower thermal actuation members expand or contract in response to the change in ambient temperature, without the use of a heating system of the aircraft to change temperatures of the upper and lower thermal actuation members.

27. The method of claim 23 wherein the upper thermal actuation member has a higher thermal expansion coefficient than a thermal expansion coefficient of the lower thermal actuation member, so the camber of the airfoil decreases during ascent of the aircraft and increases during descent of the aircraft.

28. A morphing airfoil comprising:
   a leading edge; a trailing edge; upper and lower surfaces extending between the leading and trailing edge;
   an upper thermal actuation member proximate the upper surface, wherein the upper thermal actuation member has a first thermal expansion coefficient in a chordwise direction of the airfoil, and
   a lower thermal actuation member proximate the lower surface, wherein the lower thermal actuation member has a second thermal expansion coefficient in a chordwise direction at least four times less than the first thermal expansion coefficient,
   wherein the upper and lower thermal actuation members are configured to deflect the deflect the trailing edge by at least one degree due to thermal expansions of the upper and lower thermal actuation members in response to a change in ambient temperature applied to the airfoil of at least 50 degrees Celsius,
   wherein the morphing airfoil does not include a heating system arranged to heat the upper and lower thermal actuation members to cause the trailing edge to deflect.

29. The morphing airfoil of claim 28 wherein the upper thermal actuation member is the upper surface of the airfoil and is formed of aluminum, and the lower thermal actuation member is the lower surface of the airfoil and is formed of a carbon reinforced polymer.

30. The morphing airfoil of claim 29 wherein a majority of carbon fibers forming the lower surface of the airfoil are oriented in a spanwise direction of the airfoil.

31. The morphing airfoil of claim 28 wherein the upper thermal actuation member includes aluminum strips oriented in the chordwise direction and fixed to an inside surface of the upper surface.

32. The morphing airfoil of claim 28 wherein the upper thermal actuation member includes aluminum rods extending in the chordwise direction between a forward spar and a rear spar of the airfoil, and the lower thermal actuation member includes carbon reinforced polymer rods extending in the chordwise direction between the forward spar and the rear spar.

* * * * *